UNITED STATES PATENT OFFICE.

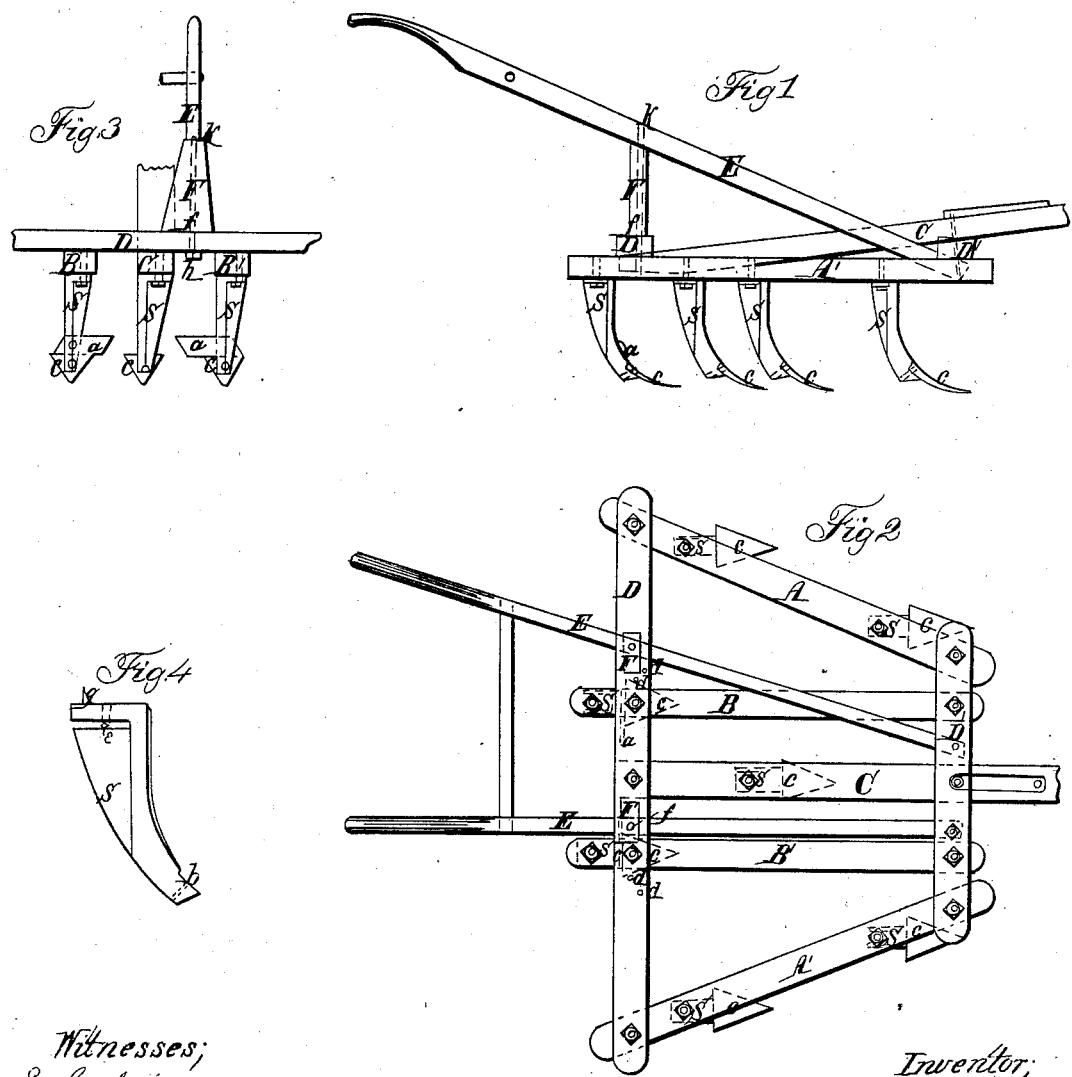

JACOB VAN HORN, OF PLAINFIELD, ILLINOIS.

IMPROVEMENT IN CULTIVATORS.

Specification forming part of Letters Patent No. 35,961, dated July 22, 1862.

*To all whom it may concern:*

Be it known that I, JACOB VAN HORN, of Plainfield, in the county of Will and State of Illinois, have invented a new and useful Improvement in Two-Horse Cultivators; and I do hereby declare that the following is a full, clear, and exact description thereof, reference being had to the accompanying drawings and the letters and figures marked thereon, which form a part of this specification.

In the aforesaid drawings, Figure 1 represents a side elevation of my improved cultivator; Fig. 2, a plan or top view thereof; Fig. 3, an end view of a section of the same, seen from behind; and Fig. 4, an enlarged view of the standards, marked S, to which the shares $c$ are attached.

Similar letters in the several figures indicate corresponding parts of my invention.

The nature of my invention consists in having a cultivator so constructed and arranged that each time it passes through the corn it completely cultivates and finishes up two rows of corn, and which may by a simple change also be used to plow or harrow in grain when the same is sown broadcast upon the soil.

To enable those skilled in the art to construct and use my invention, I will now proceed to describe it with particularity.

The frame or body of my cultivator is of wood, the parts being constructed of any suitable dimensions.

A A' are bars firmly bolted to the transverse bars D D', in the manner shown in the drawings. The longitudinal adjustable bars B B' are bolted to D and D'. These bars are regulating-bars. The bolts through D being removed, the bars may be moved out and fastened again, the bolts passing through the holes $d\ d$.

C is the tongue whereby the cultivator is drawn. The rear end of C lies beneath D and is firmly fastened to it. It passes above D', to which it is also fastened, as seen in Figs. 1 and 2.

E E are the handles, supported by the braces F, through which braces pass the rods $f$. By means of these rods, which are headed at $k$, when the braces F and the handles become worn and loosened by use they may be tightened again and rendered firm and strong by means of a nut or its equivalent, at $h$ in Fig. 3.

S represents cast-iron standards, (shown separately in Fig. 4,) which are bolted firmly to the bars A A' B B' C, and to which the shares marked $c$ are attached. Through the upper base of S is a perforation (marked $e$) whereby it is bolted to the frame of the cultivator, $g$ being a spur, which being pressed into the wood, renders it more firmly fixed in its place; and $b$ is the bed whereto the share $c$ is fastened.

$a\ a$ are wings attached to the standards, the latter being fixed to the regulating-bars B B', above the shares $c$, as shown in the drawings, for the purpose of throwing the earth about the corn.

When this cultivator is used to cultivate corn or anything planted in drills or rows the central standard fixed to C must be removed to allow the row to come between the regulating-bars B B'. If it be the first time of cultivating the corn, the wings $a$ are to be removed also; but upon cultivating the corn on the second time the wings $a$ are to be placed as shown in the drawings, their effect being to throw the earth more abundantly and closely about the corn.

When this cultivator is used to harrow or plow in grain sown broadcast the standard and share must be fixed upon C, as shown.

What I claim as my invention is—

The combination of the peculiarly-constructed standards S with the removable wings $a$, the regulating-bars B B', and braces F, all arranged and operating as and for the purposes described.

JACOB VAN HORN.

Witnesses:
E. CORBIN,
T. WHITLEY.